US006668615B2

(12) United States Patent
Bodenmueller et al.

(10) Patent No.: US 6,668,615 B2
(45) Date of Patent: Dec. 30, 2003

(54) METHOD AND APPARATUS FOR THE AUTOMATIC SETTING OF INJECTORS

(75) Inventors: Manfred Bodenmueller, Graben-Neudorf (DE); Lothar Mueller, Heidelberg (DE); Gerhard Freiseis, St. Leon-Rot (DE)

(73) Assignee: Rohwedder Microtech GmbH & Co. KG, Bruchsal (DE)

( * ) Notice: Subject to any disclaimer, the term of this patent is extended or adjusted under 35 U.S.C. 154(b) by 0 days.

(21) Appl. No.: 10/190,557

(22) Filed: Jul. 9, 2002

(65) Prior Publication Data

US 2003/0070471 A1 Apr. 17, 2003

(30) Foreign Application Priority Data

Oct. 15, 2001 (DE) ........................................ 101 50 786

(51) Int. Cl.[7] ........................ F02M 67/00; G01M 15/00
(52) U.S. Cl. ........................ 73/1.71; 73/1.36; 73/119 A
(58) Field of Search ................................ 73/1.71, 1.36, 73/119 A

(56) References Cited

U.S. PATENT DOCUMENTS 3,408,862 A * 11/1968 Hainz ........................ 73/119 A
3,667,437 A * 6/1972 Dreisin ........................ 123/449
3,946,590 A * 3/1976 Bechstein et al. ........... 73/1.74
4,254,653 A * 3/1981 Casey et al. ................. 73/1.26
4,359,032 A * 11/1982 Ohie .......................... 123/458
4,437,341 A * 3/1984 Ito et al. .................... 73/119 A
4,903,669 A * 2/1990 Groff et al. ................. 123/478
5,143,301 A * 9/1992 Reiter et al. ............. 239/585.4
5,241,858 A * 9/1993 Wieczorek et al. ....... 73/119 A
5,535,621 A * 7/1996 Glidewell et al. ........ 73/119 A
5,634,448 A * 6/1997 Shinogle et al. ............ 123/480
5,641,891 A * 6/1997 Frankl et al. ................ 73/1.72
5,806,487 A * 9/1998 Dolenc ....................... 123/357
6,260,404 B1 * 7/2001 Aota et al. ................... 73/1.36
6,359,925 B1 * 3/2002 Schilling ..................... 375/147

* cited by examiner

*Primary Examiner*—Hezron Williams
*Assistant Examiner*—David Rogers
(74) *Attorney, Agent, or Firm*—Harness, Dickey & Pierce, P.L.C.

(57) ABSTRACT

An adjusting apparatus and method for automatic setting of injectors are disclosed. The setting is carried out via accurate adjustment of the distance between an actuator and a lever element. In the process, an injector to be set is provided in the correct position in a measurement and setting station and is coupled to a pressure generating device. The setting element of the injector is then rotated in such a way that the injector switches through at a specific setting of the setting element. At the same time, the current values for the torque applied to the setting element, for the angular position of the setting element, for the exciter voltage applied to the actuator and for the pressure drop caused by the switching-through action are registered and compared with predefined parameters. If all the measured values agree with the predefined parameters, then the injector has been set correctly.

15 Claims, 1 Drawing Sheet

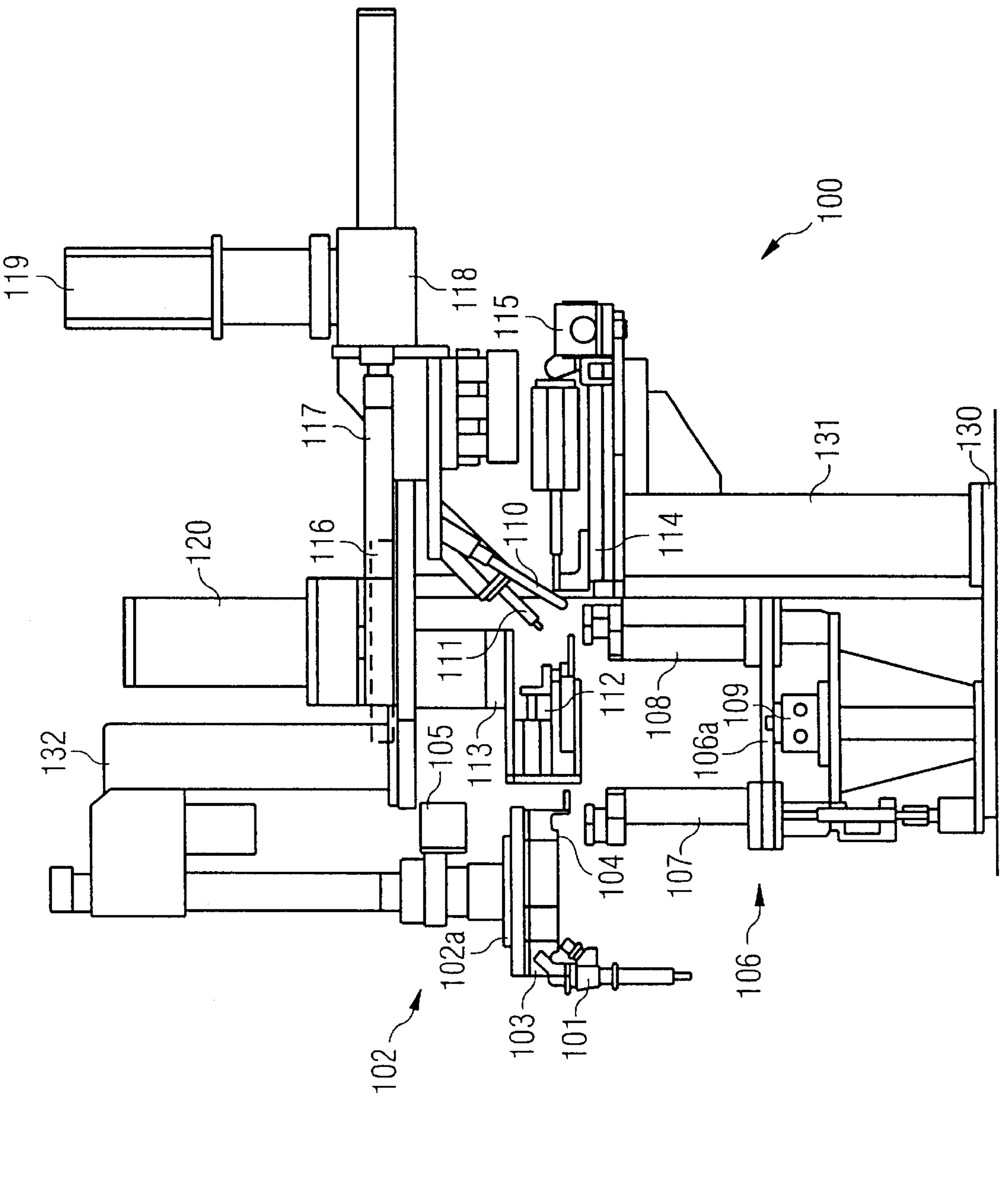
100
119
118
115
117
131
130
110
114
116
120
111
112
108
109
106a
132
105
113
104
107
102a
106
103
101
102

METHOD AND APPARATUS FOR THE AUTOMATIC SETTING OF INJECTORS

This application claims priority of German Patent Application No. 10150786.0, filed Oct. 15, 2001, the entire contents of which are hereby incorporated by reference.

BACKGROUND OF THE INVENTION

1. Field of the Invention

The present invention relates to a method and an apparatus for the automatic setting of injectors, in particular a method and an apparatus for the automatic setting of fuel or diesel injectors in the course of the production of the injectors in a production line, each injector including a piezoelectric actuator, a straight-through valve, a lever element coupled to the straight-through valve and a setting element coupled to the piezoelectric actuator.

2. Related Art

The production of modern diesel injectors is currently normally carried out by way of a two-stage production process. In a first process, the individual components of the diesel injectors are assembled within the context of preassembly and, for example, screwed to one another. In a second process, the preassembled diesel injector is set so as to be serviceable, that is to say the injector is adjusted in such a way that firstly it has the longest possible lifetime and secondly it makes a contribution to achieving the lowest possible fuel consumption. Modern diesel injectors operate with a so-called piezoelectric actuator, which is coupled to a straight-through valve via a lever element, so that by applying a suitable electrical voltage to the piezoelectric actuator, the opening of closing of the straight-through valve can be controlled. In order to optimize the lifetime of the diesel injector and the injection behaviour of the diesel injector, the physical position of the piezoelectric actuator relative to the lever element must be set as accurately as possible. In particular in the case of diesel injectors which permit multiple injection, the distance between the piezoelectric actuator and the lever element via which the straight-through valve is triggered must be set very precisely. In this connection, multiple injection is understood to mean switching through the injector repeatedly within a very short time interval, by the straight-through valve being opened and closed several times one after another.

For this reason, in modern diesel injectors the piezoelectric actuator can be displaced relative to the lever element by way of a setting element. In this way, adjustment of the piezoelectric actuator relative to the lever element can be achieved accurately down to a few micrometers. This adjustment, with which the injection behaviour of the diesel injector is set, is generally carried out manually at manual workstations.

SUMMARY OF THE INVENTION

One embodiment of the present invention provides a method and an apparatus for the automatic setting of injectors. That is, an injector preassembled on a production line being set so as to be serviceable.

The method according to the invention has the advantage that the injector setting may be carried out independently of an operator, so that the precision of the injector setting is increased. In particular in the case of the production of a large number of injectors, it is therefore possible to ensure that all the injectors are set largely identically. As a result of the use of a plurality of identically set injectors in a diesel engine having a plurality of cylinders, it is therefore possible for the overall engine behaviour to be improved.

According to an exemplary embodiment of the present invention, an injector set by way of the method of the present invention may be classified as correctly set when all the registered values agree with predefined parameters. Alternatively, the setting of the injector can also be checked by way of an injector test procedure, in which the piezoelectric actuator has a predetermined voltage/time profile applied to it. In this case, the injector set by way of the method of the present invention may be classified as correctly set when it switches through at a specific predefined voltage level. If the switching through action takes place at a different voltage level, the injector may be classified as incorrectly set. Therefore, a setting of the injector which is correct, that is to say has been carried out within a predefined tolerance, can be registered reliably.

According to another embodiment of the present invention, the setting procedure of the injector may be repeated if the injector has previously been classified as incorrectly set. This has the advantage that an initially incorrectly set injector does not have to be removed from the production process, but instead may be developed into a fully serviceable injector by way of a renewed correct setting. In this case, it may be practical to limit the number of setting procedures to be repeated. Depending on the size of the tolerance band for a correctly set injector, the maximum number of setting procedures to be carried out may, for example, lie between one and ten or even more. This ensures that, for example as a result of faulty preassembly of the injector to be set, the method according to the present invention is not carried out infinitely often, which would lead to a fault in the overall production sequence.

Additionally, according to the present invention, a correctly set injector may be removed from the measurement and setting station after the setting procedure. Thus, following the removal of the correctly set injector, a further injector preassembled on the production line can be provided in the correct position in the measurement and setting station by way of the handling apparatus.

This provides the possibility for a large number of preassembled injectors to be set correctly by way of setting procedures carried out one after another, and thus the productivity of the injector production can be increased significantly.

According to yet another embodiment of the present invention, the piezoelectric actuator has a specific sequence of charging pulses applied to it before the adjustment of the setting element. In this way, the reliability of the setting procedure can be increased considerably, since the characteristic expansion behaviour of the piezoelectric actuator when a specific electrical voltage is applied depends on the signals previously applied to the actuator. As a result of applying defined charging pulses to the piezoelectric actuator, the actuator is brought into a precisely defined state before the actual setting procedure. The precision of the injector setting can thus additionally be increased, so that in particular the number of setting procedures to be carried out again is reduced if the injector has previously been classified as incorrectly set.

Before the adjustment of the setting element, the injector is coupled to a high-pressure reservoir assuming a limited volume. As a result of the choice of a relatively small limited volume of, for example, 5 to 20 $cm^3$, when the injector is switched through, a relatively large, significant pressure change is effected, which can be registered reliably by a manometer belonging to the pressure generating device.

According to a further preferred embodiment of the invention, during the adjustment of the setting element, the course of the torque applied to the setting element, the course of the angular position of the setting element, the course of the voltage applied to the actuator and/or the course of the pressure applied to the injector are registered. Registering the entire chronological course of the respective parameters has the advantage that, as compared with registering the parameters at a single time, more accurate assessment with regard to the correct setting of the injector can be performed.

The injector can additionally be fixed by way of a gripping apparatus, so that the risk of rotation of the injector during the adjustment of the setting element is reduced.

The apparatus according to an embodiment of the present invention may be achieved by an apparatus for the automatic setting of injectors having the features of claim 10.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 illustrates a setting apparatus for the automatic setting of diesel injectors according to an exemplary embodiment of the invention.

DETAILED DESCRIPTION OF THE PREFERRED EMBODIMENTS

In the following text, the construction of a setting apparatus 100 for the automatic setting of diesel injectors will be explained using the FIG. 1. Then, the function of the setting apparatus 100 and the method for the automatic setting of diesel injectors by way of the setting apparatus 100 will be explained.

As illustrated in FIG. 1, the setting apparatus 100 has a first handling apparatus 102, which includes a first holder 103 and a second holder 104. The two holders 103, 104 are used to hold a preassembled diesel injector 101 which is subsequently to be set. The two holders 103, 104 are fixed to a rotary table 102*a,* which can be rotated by means of a drive 105. In this way, the diesel injector 101 can be brought, by way of a 180° rotation of the first rotary table 102*a,* to a position in which the diesel injector 101 can be transferred to a second handling apparatus 106.

The second handling apparatus 106 has a second rotary table 106*a,* on which a first injector holder 107 and a second injector holder 108 are formed. The second handling apparatus 106 also has a rotational unit 109, by way of which the second rotary table 106*a* can be rotated. During a 180° rotation of the second rotary table 106*a,* a diesel injector previously transferred to the second handling apparatus 106 is thus provided in the correct position in the measurement and setting station.

The setting apparatus 100 further has a holding apparatus 114, a high-pressure connection 110, an electrical connecting device 111 and a screwing device 112. By way of the holding apparatus 114, a diesel injector 101 provided in the correct position can be fixed in its position, and thus unintentional movement of the diesel injector 101 can be prevented. The high-pressure connection 110 is used to couple the diesel injector 101 provided in the correct position to a pressure generating device, not illustrated. The electrical connecting device 111 is used for the electrical connection of the piezoelectric actuator of the diesel injector 101 provided in the correct position to a signal generating device, not illustrated. In this case, electrical contact is made via contact tongues which are formed in a plug housing of the diesel injector 101. The high-pressure connection 110 and the electrical connecting device 111 are mounted such that they can be displaced along their longitudinal direction and can be moved along this longitudinal direction by way of a pneumatic drive, not illustrated.

The holding apparatus 114 which fixes the diesel injector 101 provided in the correct position in its position, is coupled to a drive 115, by way of which the holding apparatus 114 which, according to the exemplary embodiment illustrated here, has a fork wrench that can be displaced in the direction of the diesel injector 101 provided in the correct position.

The screwing device 112 is coupled to a torque measuring apparatus 113 which, according to the exemplary embodiment illustrated here, is a torque measuring disk. The screwing device 112 and the torque measuring apparatus 113 can be moved jointly in the vertical direction by way of a vertical drive 120. The screwing device 112 can therefore be brought from above up to a diesel injector 101 provided in the correct position. The actual adjustment of the setting element of the diesel injector 101 provided in the correct position is carried out by the torque measuring apparatus 113 and, with the torque measuring apparatus 113 the screwing device 112 as well, being rotated about an axis which runs parallel to the longitudinal direction of the diesel injector 101 provided in the correct position. Here, the rotation of the screwing device 112 is carried out via a drive 119, which is coupled via a gear box 118 and a rack 117 to a gear 116, which is in turn connected to the torque measuring apparatus 113.

The setting apparatus 100 further has a series of plates and structures which are required to hold the entire setting apparatus 100 together, for its static characteristics and for its mechanical stability. These include, for example, a base plate 130, a base plate structure 131 and a structure 132 for the first handling apparatus 102.

In the following text, the method for the automatic setting of diesel injectors 101 will be explained in more detail according to an exemplary embodiment of the invention and using the setting apparatus 100 illustrated in FIG. 1 to aid in the explanation. However, it should be understood the apparatus illustrated in FIG. 1 is being used by way of example only to explain the method according to the embodiments of the present invention.

A diesel injector 101 preassembled on a production line and previously screwed together is, for example, transferred to the first handling apparatus 102 by a conveyor belt. By way of a 180° rotation of the first handling apparatus 102, the diesel injector 101 is brought to a position in which it can be picked up by the second handling apparatus 106. Following a further 180° rotation by way of the second handling apparatus 106, the diesel injector 101 is provided in the correct position in the measurement and setting station. The diesel injector 101 provided in the correct position is then fixed by the holding apparatus 114 being moved up laterally to the diesel injector 101 and blocked. The holding apparatus 114, according to the exemplary embodiment of the invention illustrated here, has a fork wrench, not illustrated, by way of which the diesel injector 101 provided in the correct position is localised in a lower subsection. The diesel injector 101 is further fixed by way of a gripping apparatus, not illustrated in the figure, which likewise has the form of a fork wrench and acts on an upper subsection of the diesel injector 101 provided in the correct position.

Both by way of the holding apparatus 114 and by way of the gripping apparatus, not illustrated, the torque occurring during an adjustment of the setting element of the diesel injector 101 provided in the correct position can be compensated for. Following the fixing of the diesel injector 101 provided in the correct position, both the high-pressure connection 110 and the electrical connecting device 111 are brought up to the diesel injector 101. Via the high-pressure connection 110, the diesel injector 101 is coupled to a pressure generating device, not illustrated. A pressure of about 40 bar is applied to the high-pressure connection of the diesel injector. By way of the electrical connecting device 111, the piezoelectric actuator of the diesel injector 101 is connected to an electrical connecting device 111. Electrical contact is made in this case via contact tongues which are formed in a plug housing of the diesel injector 101.

In order to bring the piezoelectric actuator of the diesel injector 101 into a defined initial state, the piezoelectric actuator has charging pulses, for example at a frequency of 50 Hz, applied to it for a specific time interval, during each of which pulses a specific predefined amount of charge is transferred to the piezoelectric actuator. After a specific waiting time has elapsed, of for example 2 to 4 seconds, the piezoelectric actuator then changes into a relatively accurately defined initial state.

Then, the screwing device 112, which has a fork wrench positioned centrally over the diesel injector 101 provided in the correct position, is moved downward pneumatically by way of the vertical drive 120. In the process, the fork wrench searches for the wrench faces on the setting element, which is a hollow screw or a nut and surrounds the diesel injector 101.

According to the exemplary embodiment of the invention illustrated in FIG. 1, the wrench faces of the setting element have a size of 20 mm across flats. Then, the screwing device 112 is driven via a toothed drive, which includes the drive 119, the gear box 118, the rack 117 and the gear 116. In order to avoid damage to the gear drive, an overload clutch, not illustrated in the figure, is provided downstream of the drive 119.

During the screwing operation, during the entire screwing movement, the torque acting on the setting element, the voltage applied to the piezoelectric actuator and the instantaneous angular position of the screwing device are registered. The torque acting on the setting element is registered by the torque measuring apparatus 113. The voltage applied to the piezoelectric actuator is registered by the electrical signal generating device, not illustrated, which is connected to the piezoelectric actuator via the electrical connecting device 111. The setting element of the diesel injector 101 to be set is adjusted until the diesel injector 101 switches through at a specific setting. At this time, the pressure applied to the diesel injector via the high-pressure connection 110 drops. The resulting pressure drop is registered and, together with the values for the torque applied to the setting element, for the voltage applied to the piezoelectric actuator and for the angular position of the setting element, is compared with predefined parameters. If, then, all of the registered values agree with the predefined parameters, the diesel injector 101 is then classified as correctly set. If not all of the registered values agree with the predefined parameters, then the diesel injector 101 is classified as incorrectly set.

If the diesel injector 101 is classified as incorrectly set, then the setting element of the diesel injector 101 is rotated back into an initial position, and the setting procedure previously described is carried out again. Alternatively, the set diesel injector 101 can also be subjected to an injector test procedure, with which the setting of the diesel injector 101 is checked more accurately.

According to an exemplary embodiment of the invention, in the injector test procedure, the piezoelectric actuator has a voltage profile applied to it that increases over time in the form of a ramp, and the voltage level at which the set diesel injector 101 switches through is registered. Depending on the height of the voltage level at which the set diesel injector 101 switches through, the injector is classified as correct or incorrect.

If, following automatic setting of the diesel injector 101 and possibly after an injector test procedure, the diesel injector 101 is classified as correctly set, then the high-pressure connection 110, the electrical connecting device 111, the screwing device 112, the holding apparatus 114 and the gripping apparatus, not illustrated, are then moved back into their initial positions. The set diesel injector 101 is then removed from the measurement and setting station by way of the second handling apparatus 106 and the first handling apparatus 102 and, at the same time, a new diesel injector 101 to be set is fed in.

In the case of an incorrectly set injector 101, the setting procedure described above is carried out again.

It is pointed out that, in particular in order to avoid disruptive vibrations, all movements within the setting apparatus 100 are preferably driven pneumatically.

In summary, the present invention provides a setting apparatus 100 and a method for automatic setting of injectors 101 having a piezoelectric actuator, a straight-through valve, a lever element coupled to the straight-through valve and a setting element coupled to the actuator. The setting is carried out via accurate adjustment of the physical distance between the actuator and the lever element. In the process, an injector 101 to be set is firstly provided in the correct position in a measurement and setting station and, via a high-pressure connection 110, is connected to a pressure generating device and, via an electrical connecting device 111, is connected to an electrical signal generating device. The setting element of the diesel injector 101 is then rotated in such a way that the injector 101 switches through at a specific setting of the setting element. In this case, the current values for the torque applied to the setting element, for the angular position of the setting element, for the excitation voltage applied to the actuator and for the pressure drop caused by the switching-through action are registered and compared with predefined parameters. If all the measured values agree with the predefined parameters, then the diesel injector 101 has been set correctly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for the automatic setting of injectors, each injector including a piezoelectric actuator, a straight-through valve, a lever element coupled to the straight-through valve and a setting element coupled to the piezoelectric actuator, by way of which a physical position of the piezoelectric actuator relative to the lever element is adjustable, the method comprising:

(a) positioning an injector in a predetermined physical position in a measurement and setting station by way of a handling apparatus;

(b) coupling the injector to a pressure generating device via a high-pressure connection;

(c) coupling the piezoelectric actuator to an electric signal generating device via an electrical connection device;

(d) adjusting the setting element by way of a screwing device, the adjusting of the setting element thereby moving the piezoelectric actuator in a direction of the lever element until the injector switches through at a specific setting of the setting element; and (e) registering the values, that are current when the injector switches through, for the torque applied to the setting element, for the angular position of the setting element, for the exciter voltage applied to the injector, and for the pressure drop caused by the switching-through action thereby automatically setting the injectors.

2. The method as claimed in claim 1, wherein the injector is classified as correctly set when all the registered values agree with predefined parameters or if the injector coupled to the pressure generating device switches through at a specific predefined voltage level during an injector test procedure, in which the actuator has a predetermined voltage/time profile applied to it, and in which the injector is otherwise classified as incorrectly set.

3. The method as claimed in claim 2, wherein an incorrectly set injector is reset by the setting element being turned back into an initial position, then steps (d) and (e) being carried out again, and the injector being reclassified in accordance with claim 2 as correctly or as incorrectly set.

4. The method as claimed in claim 3, wherein before the adjustment of the setting element, the pressure generating device is set in such a way that the injector is coupled to a high-pressure reservoir assuming a limited volume.

5. The method as claimed in claim 3, wherein the injector test procedure has a voltage level that increases over time in the form of a ramp.

6. The method as claimed in claim 2, wherein the correctly set injector is uncoupled from the pressure generating device, the piezoelectric actuator of the correctly set injector is uncoupled from the electric signal generating device, and the correctly set injector is removed from the measurement and setting station by way of the handling apparatus.

7. The method as claimed in claim 6, wherein the injector test procedure has a voltage level that increases over time in the form of a ramp.

8. The method as claimed in claim 2, wherein the injector test procedure has a voltage level that increases over time in the form of a ramp.

9. The method as claimed in claim 2, wherein, before the adjustment of the setting element, the piezoelectric actuator has a predetermined voltage profile applied to it, has a predetermined sequence of voltage pulses applied to it and has a specific sequence of charging pulses applied to it.

10. The method as claimed in claim 2, wherein before the adjustment of the setting element, the pressure generating device is set in such a way that the injector is coupled to a high-pressure reservoir assuming a limited volume.

11. The method as claimed in claim 1, wherein, before the adjustment of the setting element, the piezoelectric actuator has a predetermined voltage profile applied to it, has a predetermined sequence of voltage pulses applied to it and has a specific sequence of charging pulses applied to it.

12. The method as claimed in claim 1, wherein before the adjustment of the setting element, the pressure generating device is set in such a way that the injector is coupled to a high-pressure reservoir assuming a limited volume.

13. The method as claimed in claim 1, wherein, adjusting of the setting element further includes registering the course of the torque applied to the setting element, the course of the angular position of the setting element, the course of the voltage applied to the piezoelectric actuator, and the course of the pressure applied to the injector.

14. The method as claimed in claim 1, wherein the injector is fixed in the predetermined position in the measurement and setting station by way of a gripping apparatus.

15. The method as claimed in claim 1, wherein, adjusting of the setting element further includes registering one of the course of the torque applied to the setting element, the course of the angular position of the setting element, the course of the voltage applied to the piezoelectric actuator, and the course of the pressure applied to the injector.

* * * * *